Jan. 19, 1965 R. E. FORRESTER ETAL 3,166,692
ALTERNATING CURRENT SOLENOID
Filed Sept. 25, 1961
FIG. 2
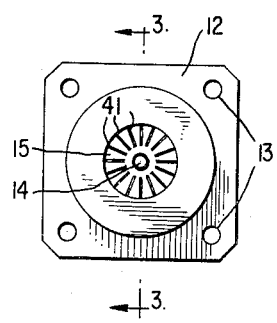
FIG. 1
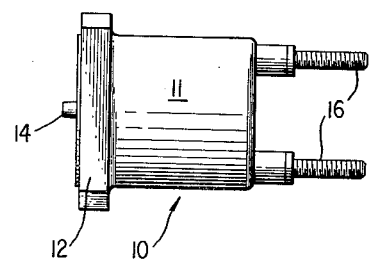
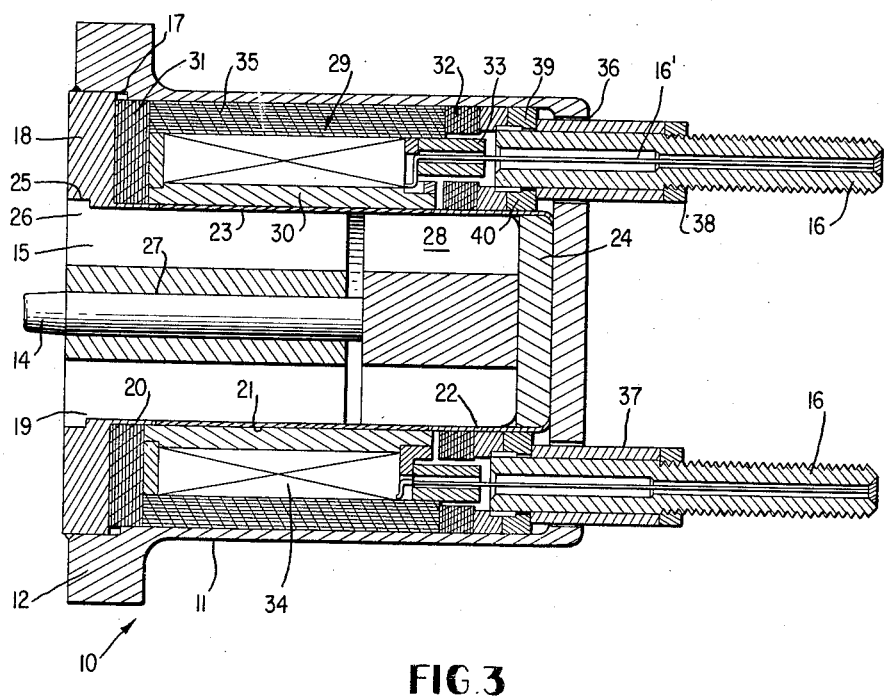
FIG. 3
INVENTORS.
ROBERT E. FORRESTER
ALAN H. CORNISH
BY Robert B Harmon
ATTORNEY

United States Patent Office 3,166,692
Patented Jan. 19, 1965

3,166,692
ALTERNATING CURRENT SOLENOID
Robert E. Forrester and Alan H. Cornish, Corry, Pa., assignors to Aero-Flow Dynamics, Inc., Corry, Pa., a corporation of New York
Filed Sept. 25, 1961, Ser. No. 140,277
2 Claims. (Cl. 317—186)

This invention relates to solenoid structures generally and more particularly to an improved A.C. solenoid especially adapted to provide effective operation in environments where high pressures may be experienced.

It has long been advantageous to utilize solenoid actuators to control the operation of valve units in a high pressure fluid system, for the control capabilities of solenoid valve actuators render them desirable for use in aircraft systems, fuel control systems, and similar high pressure hydraulic systems. However, solenoid actuators previously developed for use in high pressure fluid or hydraulic systems have been subject to numerous disadvantages occasioned by the constructional features required to enable the solenoids to withstand the extreme pressures to which they would be submitted.

The primary disadvantages experienced by previously developed A.C. solenoid valve actuators has been the large current losses incurred through the use of an internal tube or housing which isolates the electrical components of the solenoid from the solenoid core structure and movable plunger. These losses are especially prevalent in high frequency solenoid structures, as the current loss is a direct function of frequency. The internal housing or tube is subjected to the high fluid pressures experienced by the valve or similar component to which the solenoid is attached, and, therefore, this internal housing has previously included a thick-walled tube of high strength metallic material. The inner housing interferes with the magnetic flux path within the solenoid, thereby causing high magnetic and eddy current losses which detract from the over-all efficiency of the solenoid. It has been established that the wattage consumed by a valve actuating solenoid is a direct function of the thickness of this inner housing.

It is the primary object of this invention to provide an improved solenoid capable of efficient operation in a high pressure environment.

Another object of this invention is to provide an improved solenoid especially adapted for use as an actuator for valve units or similar components included within a high pressure fluid system.

A further object of this invention is to provide an improved solenoid having constructional characteristics which insure efficient operation in a high pressure environment with minimum magnetic and eddy current losses.

Another object of this invention is to provide an improved solenoid actuator capable of withstanding the extreme pressures inherent in fluid pressure systems while incorporating a thin-walled inner housing assembly to isolate the electrical components of the solenoid from the solenoid plunger unit.

A further object of this invention is to provide an improved solenoid having a thin-walled inner housing assembly sectionally constructed from materials having differing magnetic properties to minimize magnetic and eddy current losses which is made capable of withstanding internal pressures by the provision of a strong surrounding field and coil assembly which receives substantially all of the pressure from the inner housing.

A still further object of this invention is to provide an economical solenoid of reduced size and weight which is capable of withstanding high fluid pressures.

With the foregoing and other objects in view, the invention resides in the following specification and appended claims, certain details of construction of which are illustrated in the accompanying drawings in which:

FIGURE 1 is a view in side elevation of the solenoid of the present invention,

FIGURE 2 is an elevational view of the left-hand end of the solenoid of FIGURE 1, and FIGURE 3 is an enlarged, longitudinal sectional view of the solenoid of the present invention taken along lines 3—3 of FIGURE 2.

Referring now to FIGURES 1 and 2, the solenoid of the present invention indicated generally at 10 includes a hollow, body member 11 having an open end about which a flange 12 is provided. Flange 12 includes a plurality of apertures 13 through which suitable attaching means (not shown) may be inserted to secure the solenoid 10 to a high pressure valve or other similar device.

Projecting from the interior of the body 11 is an actuating pin 14 which extends through a slotted core member 15 to be hereafter described.

A pair of terminal posts 16 extend from the closed end of the solenoid body 11 opposite the flange 12, and are adapted to be electrically connected to a suitable power source.

Referring now to FIGURE 3, it may be seen that flange 12 is provided with a circular cut-away section 17 which receives a circular shoulder 18 of an inner cylindrical housing assembly 19. The sidewalls of the housing 19 are formed by three cylindrical, ring-like sections 20, 21 and 22 which are connected by welding to form a solid cylindrical wall 23. The individual sections of wall 23 are composed of magnetic and non-magnetic material with end section 20, which includes the shoulder 18, and end section 22 being of magnetic material, while middle section 21 is formed from non-magnetic material. Sections 20, 21 and 22 are machined to such an extent that the resulting wall 23 is as thin as possible. It has been found feasible, where the inner assembly 19 of the solenoid 10 is required to contain a pressure of 10,000 p.s.i., to machine the wall 23 to a thickness of only .016 inch.

Section 22 of wall 23 is connected to a thick circular end wall or base plate 24 by welding or other suitable means.

The shoulder 18 of the inner housing assembly 19 is provided with a circular cut-out portion 25 which seats a shoulder 26 formed at one end of the stationary core 15. Core 15 is encased within the inner housing 19 and includes an axially extending bore 27 through which the actuating pin 14 of the solenoid 10 projects. Actuating pin 14 is connected to a solenoid plunger 28, which is encased within the inner housing assembly 19 in spaced relationship to the core member 15. Both the core member 15 and the plunger 28 are provided with narrow slots 41 extending lengthwise thereof as indicated by FIGURE 2.

The wall 23 of the internal housing assembly 19 is spaced from the body member 11 to provide a chamber wherein the field and coil assembly 29 of the solenoid 10 is retained. Field and coil assembly 29 includes a tubular spool 30 of ceramic material which fits tightly around the wall 23 of the tubular inner housing 19. At either end of the spool 30 are groups of ferro magnetic laminations 31 and 32 which are closely fitted to the outside diameter of the cylindrical wall 23 to provide a low loss laminated field structure for the solenoid 10. Laminations 32 are provided with circular apertures 33 which receive the terminal posts 16 of the solenoid structure 10.

The ceramic spool 30 supports an exciting coil 34 which is formed by spirally winding a continuous length of high voltage, insulated, wire upon the spool 30. The coil 34 is wound upon the spool 30 with concurrent applications of ceramic potting compound which, when properly cured, add to the original strength of the ceramic spool by imparting to the entire coil structure a rock-like consistency, thereby making the coil assembly 29 capable of absorbing stresses transmitted from the inner housing 19.

Positioned between the laminations 31 and 32 and tightly encircling the spool 30 and the coil 34 is a stack of ferro magnetic laminations 35. Laminations 35 fill the space between the coil 34 and the solenoid body 11, and thereby impart additional strength to the field and coil assembly 29.

The terminal posts 16 extend through apertures 36 in the closed end of the solenoid body 11 and are provided with insulating sleeves 37 which insulate the posts 16 from the solenoid body 11. Insulating sleeves 37 are retained between outer washers 38, which are attached to the terminal posts 16, and a terminal post retaining assembly 39. The terminal post retaining assembly 39 is composed of circular ceramic insulating retainers 40 which are tightly compressed between the insulating sleeves 37 and the stack laminations 32. Terminal posts 16 extend through apertures 33 in the laminations 32 and are electrically connected to the coil 34 by leads 16'.

In operation, the solenoid 10 of the present invention may be advantageously employed as an actuator mechanism for valve units utilized within high pressure fluid systems. When used as a valve actuator, the solenoid 10 would be connected to a high pressure valve by means of connectors inserted through the apertures 13 of the flange 12. The solenoid actuating pin 14 would extend into the valve casing and would engage the valve mechanism, not shown. The spring action of this valve mechanism would hold the solenoid plunger 28 in the retracted position against the end wall 24 of the inner housing assembly 19, as illustrated by FIGURE 3 until the solenoid coil 34 was energized. At this time, the plunger 28 would move toward the stationary core member 15, thereby actuating the valve mechanism.

With the solenoid actuating pin 14 engaging a valve mechanism within a high pressure fluid system, the wall 23 and the end wall 24 of the inner housing assembly would be subjected to the pressures existing within the fluid system. The thin wall 23 taken alone is incapable of withstanding even minimal pressures due to the extreme thinness of this wall. The wall 23 is of such a degree of thinness relative to the walls of the body member 11 and the other components of the solenoid 10, that it must be supported by an internal form during the machining operation. However, in the finished solenoid, the wall 23 is rendered capable of withstanding high fluid pressures, for this wall is reinforced by the spool 30, the potted coil 34, and the metallic laminations 31, 32 and 35, as well as by the outer body assembly 11. These close fitting parts serve to back up the inner housing assembly 19 by accepting substantially all of the stress created by internal pressure. The heavy shoulder 18 and the thick end wall 24 of the inner housing assembly 19 act with the heavy flange 12 and closed end structure of the outer body assembly 11 to permit transmission of endwise forces created by internal pressure down through the side walls of the body member 11 and into the connecting units which hold the entire assembly to an adjacent valve housing.

The solenoid 10 is capable of operating efficiently from a 400 cycle, 115 volt power supply with no intermediate rectification stage. The construction of the inner housing assembly 19, the stationary core 15, and the plunger 28 enable the solenoid 10 to operate with minimum magnetic and eddy current losses. The combination of the laminated fixed magnetic components 31, 32 and 35 together with the slotted plunger 28 and the slotted fixed core member 15 take advantage of the minimum eddy current losses inherent in a laminated alternating current magnetic circuit, while retaining the structural and mechanical advantages of a slotted construction for the components which are subject to mechanical movement and wear.

The efficiency of the tubular inner housing 19 is advanced by the thinness of the wall 23 and the alternate sections 20, 21 and 22 of magnetic and non-magnetic material.

It has been found that the extremely thin wall 23 of the inner assembly 19 reduces the concentration of eddy current through the inner housing assembly, which represents a short circuit to the core 15 for such eddy currents. If the wall 23 were constructed entirely of magnetic material, losses would be incurred due to eddy currents generated in the material itself in addition to the further loss incurred due to the flux short circuit path to the working components inside the inner housing assembly 19. Furthermore, if the wall 23 were composed entirely of non-magnetic material, a non-productive gap would be introduced in the magnetic circuit between the field and coil assembly 29 and the stationary core 15 and plunger 28.

By constructing the wall 23 from the extremely thin segments 20 and 22 of magnetic material and 21 of non-magnetic material, the non-productive gap in the magnetic circuit of the solenoid is greatly minimized, while the losses, which might be incurred, if the walls 23 were entirely of magnetic material, are eliminated. The welds between the segments 20, 21 and 22 permit transition from magnetic to non-magnetic and back to magnetic material and additionally eliminate air-gaps in the flux path through the wall 23.

It will thus be apparent to those skilled in the art that the invention provides an improved solenoid construction capable of operating with increased efficiency under high pressure conditions. Obvious modifications of the solenoid construction disclosed by this invention such as would occur to one skilled in the art, are deemed to be within the concepts presented herein and within the scope of the appended claims.

What is claimed is:

1. A solenoid adapted for use with high pressure systems, comprising a hollow body structure having an open end and a closed end, an inner housing assembly including a thin, cylindrical sidewall formed by two end sections of magnetic material integrally connected to a center section of non-magnetic material, a thick end wall secured to one of the end sections at the closed end of the body structure, the remaining end section being provided with a laterally extending shoulder, said shoulder being attached to the open end of said body structure, whereby said inner housing assembly is completely enclosed within said body structure with said thin, cylindrical sidewall being maintained in spaced relationship thereto and said thick end wall in juxtaposition with said closed end thereof, a slotted core member secured within said inner housing assembly, said core member having an axial bore extending therethrough, a slotted plunger provided within said inner housing assembly in axial, spaced relationship to said core member, said plunger being relatively movable between said core member and the thick end wall of said inner housing assembly, an actuating pin connected to said plunger and extending through the bore of said core member, and a field and coil assembly tightly surrounding the exterior of the thin, cylindrical wall of said inner housing assembly and extending coaxially thereof between said thin, circular wall and said body structure, said field and coil assembly including a ceramic spool mounted upon said thin wall, an exciting coil wound upon said ceramic spool, said exciting coil being encased in cured ceramic potting compound of rock-like consistency, a plurality of ferromagnetic laminations mounted at either end of said ceramic spool and tightly encircling and engaging the thin wall of said inner housing assembly, and a stack of ferromagnetic laminations tightly encasing said exciting coil and extending between said exciting coil and said body structure into engagement with the end laminations, said spool, exciting coil, and laminations being formed to cooperate with said body structure in absorbing substantially all of the pressure applied to the interior of said inner housing assembly.

2. The solenoid structure of claim 1, wherein the thin, cylindrical sidewall of said inner housing assembly is machined to a thickness of approximately .016 inch.

References Cited by the Examiner
UNITED STATES PATENTS

| | | | |
|---|---|---|---|
| 2,561,355 | 7/51 | Fish | 317—191 |
| 2,562,392 | 7/51 | Ray | 317—191 |
| 2,629,766 | 2/53 | Vargo | 317—191 |
| 3,050,663 | 8/62 | Zipper | 317—186 |

JOHN F. BURNS, *Primary Examiner.*